United States Patent [19]
Voss et al.

[11] Patent Number: 5,743,547
[45] Date of Patent: Apr. 28, 1998

[54] HIGH EFFICIENCY, HIGH PERFORMANCE LEADING LINK FORK DESIGN FOR BICYCLE FRONT WHEEL SUSPENSIONS

[76] Inventors: Darrell W. Voss, 687 Coal Creek Rd.; Gary G. Klein, 103 Smith Dr., both of Chehalis, Wash. 98532

[21] Appl. No.: 224,478

[22] Filed: Apr. 6, 1994

[51] Int. Cl.[6] .................................................. B62K 25/08
[52] U.S. Cl. ............................................................. 280/277
[58] Field of Search ........................... 280/276, 277, 280/279, 280, 281.1

[56] References Cited

FOREIGN PATENT DOCUMENTS

| 447790 | 4/1949 | Italy | 280/276 |
|---|---|---|---|
| 19057 | 8/1913 | United Kingdom | 280/277 |

*Primary Examiner*—Kevin Hurley
*Attorney, Agent, or Firm*—Jim Zegeer, Esq.

[57] ABSTRACT

A high efficiency bicycle front fork suspension system in which the front fork and wheel assembly are isolated from the remaining parts of the bicycle frame by a leading, 3-point linkage arrangement configured to produce a trailing link action at the wheel. The suspension system, in its preferred configuration, includes one or more fluid logic, rotary dampers and one or more high performance elastomeric or conventional spring elements carried in rear stub or shortened fork blades.

25 Claims, 7 Drawing Sheets

HIGH EFFICIENCY, HIGH PERFORMANCE LEADING LINK FORK DESIGN FOR BICYCLE FRONT WHEEL SUSPENSIONS

INTRODUCTION

The invention relates to a lightweight, high efficiency, high performance fork for bicycle front wheel suspensions. It uses a leading link mechanism to provide the preferred trailing link wheel action. The leading link geometry provides improved wheel clearance, for the full range of wheel travel, and a more efficient configuration for the structure to handle the impact loads while at the same time providing maximum torsional and lateral rigidity. The trailing link wheel action provides the most efficient wheel path, during impact, to accommodate roadway bumps and obstacles. By achieving the suspension motion by a minimum configuration of pivoting links, static friction is minimized, especially when compared to forks using a telescoping or sliding type of action. The pivoting joints are also much less sensitive to the environment, as they do not have exposed wear surfaces, as sliding type motions do.

The invention makes use of positive geometry control of the suspended motion to isolate the head-tube, handlebars and hands of the rider from the oscillations of the front wheel during rough riding. The preferred configuration utilizes elastomeric foam materials for the spring units, low static friction pivots and optimized geometry for the linkages and an optional, low friction, fluid logic rotary damper (as disclosed in PCT Appln. No. PCT/US93/08619, incorporated herein by reference) to control the dynamic responses of the wheel assembly during impact. A less expensive version of the invention uses the same low static friction linkages, but in place of the rotary damper relies on the inherent damping properties of the elastomeric spring material to control the damping and travel of the front wheel assembly at near resonant conditions.

The invention allows for convenient height and length adjustment of the handlebar without effecting the movement and performance of the suspension device. The device may be used in combination with other shock isolation units to enhance the overall performance of the system.

BACKGROUND

Prior art suspension designs for bicycles include a variety of wheel, saddle, fork and handlebar isolation concepts. Typically, these concepts consist of metal pivots and rubber, leather or metal spring elements. None of these prior art designs can be regarded as truly high performance or competition quality devices. There are several reasons for this.

First, the older designs are generally quite heavy, compared to the equivalent structure of modern racing bicycles. Weight is critical on bicycles, especially competition bicycles. The complete suspension mechanism installed should not increase the weight of the bicycle appreciably and should not detract from the overall performance of the bicycle.

Second, most of the prior art designs are not very low in static friction. This is the amount of force necessary to begin movement of the spring and damper units. Static friction must be kept low enough in the suspension to permit it to work smoothly and effectively for the full range of operating conditions, including relatively smooth ground with small bumps. High static friction in a bicycle suspension will cause it to feel "rough", it will not have a high quality, supple feel. The amount of static friction in the suspension system, therefore, must be kept very low.

Third, one of the major problems with prior art bicycle suspensions is the wear life of the bearings and damper unit. Sliding (linear) type bearings and dampers, with high contact pressure seals, function well on automobiles and motorcycles, because of their relatively high sprung mass. However, for lightweight vehicles (such as bicycles) sliding type seals are much more difficult to make work in a supple manner. On these vehicles, the friction in the seals must be proportionately less to reduce the roughness in normal riding conditions. Reducing the contact pressure of the seals, to achieve a higher quality ride, usually results in a shorter life of the seals. A special, low friction seal design is required for linear type dampers on bicycles. Generally speaking, prior art suspensions do not have these special low friction seals. In this invention, a rotary type damper (of the type disclosed in PCT Appln. No. PCT/US93/08619) is the preferred design. The reason for this is that rotary dampers are inherently low in friction, due to the mechanical advantage of the driving linkage. A linkage with a mechanical advantage of 10, for example, will experience a net reaction static friction force of $\frac{1}{10}$ of the actual.

Fourth, torsional and lateral rigidity are important design issues for high performance, competition front fork suspensions. When negotiating ruts, grooves and ridges at high speeds it is necessary that the steering response of the front wheel provide positive feedback to the rider with minimum torsional or lateral "play" and flexibility in the system. Prior art designs are torsionally weak and flexible. The disclosed design provides superior torsional rigidity through the use of over-sized tube sections and wider pivoting joints.

DESIGN CONSIDERATIONS FOR BICYCLE SUSPENSION SYSTEMS INCORPORATING THE INVENTION

We have determined through testing and evaluation that a truly superior bicycle suspension (or suspension components) must provide, as a minimum, the following characteristics:

Lightweight.

Durable and wear resistant.

Superior pivot designs to reduce "play" or looseness in the system.

Directional rigidity, with flexibility only in the desired direction of suspension travel.

Adequate amount of suspension travel.

A smooth, continuous damping method with a transition from low damping, at small deflections, to increased damping at higher deflections and velocities.

Low static friction to provide a supple "feel".

Adjustable damping curves, preferably while in use.

Fluid or damping medium with minimum temperature affects.

Damping resistance curve which increases at a smoothly diminishing rate at high velocities. Simplicity, minimum of components, fasteners and wear surfaces.

Minimize forward energy lost while encountering bumps.

Minimize pedalling energy lost from suspension resonance and absorption.

Supple suspension at handlebars and seat.

Firmer suspension at wheels.

Minimize tire "hop".

Provide adequate shock isolation to the rider.

Cushion tires and wheels from impacts.

Do nothing to cause the rider to lose control, steering or balance of the bike.

The spring rate of the system needs to be optimized to the load, suspension travel, and the excitation and damping conditions. It is generally desirable to have a relatively low spring rate in the normal working portion of the suspension, with progressively higher rates at the top and bottom portions of the travel, to prevent bottoming out or over-travel under extreme bumps or rebounds. These characteristics are inherent in the elastomeric spring pads provided by the invention.

Bicycle suspensions have some unique design problems. The pedalling motion of the rider can induce an unwanted movement and/or oscillations of the frame. The bicyclist will typically pedal between 40 and 100 revolutions per minute, each revolution consisting of two pedal strokes. Thus the cyclist is normally inducing frequencies between 1.3 and 3.3 hertz. In a sprint, the competitive cyclist can spin up to 130 revolutions per minute for a very short duration, which is 4.3 hertz. Bumps, on the other hand, can range from about 5 hertz for a large bump at low speed to more than 50 or 60 hertz for a small bump at high speed.

If we are dealing with a strictly mechanical spring-mass system, the lowest natural frequency of the system would need to be substantially larger than 3.3 hertz in order that the pedalling action would not induce unwanted oscillations or movement of the suspension system. Designing the lowest natural frequency substantially higher than 3.3 hertz would put it up into the low frequency portion of the bump range. This is not desirable either. The low frequency bumps could then induce oscillation into the suspension system. If the lowest natural frequency is raised significantly above the normal operating range of bump frequencies, the suspension would not respond adequately to the bumps we are trying to isolate. The present invention solves this problem.

By using multiple suspension actions and both intelligent variable and human damping means, a very efficient and high performance suspension system can be created. For example, with suspension actions at the handlebar and front fork, we can tune the system to greatly reduce the possibility of oscillation. The handlebar is primarily affected by the weight on the hands, with a relatively small input from the pedalling forces. We can tune the lowest natural frequency of the handlebar isolation units down close to or below the pedalling frequency range without ill effect. The front fork, on the other hand, takes a substantial amount of the pedalling forces, along with the hand forces of the handlebar. It is best tuned to a frequency above the pedalling frequencies. The same type of tuning works for the seat suspension and the rear wheel suspension. The seat will best be tuned to a lower frequency and the rear wheel will use a much stiffer spring rate to achieve a higher frequency.

BRIEF DESCRIPTION OF THE DRAWINGS

The above and other objects, advantages and features of the invention will become more apparent when considered with the accompany drawings wherein.

DESCRIPTION OF PRIOR ART DESIGNS

Telescoping Tube Concept

Figure 1:
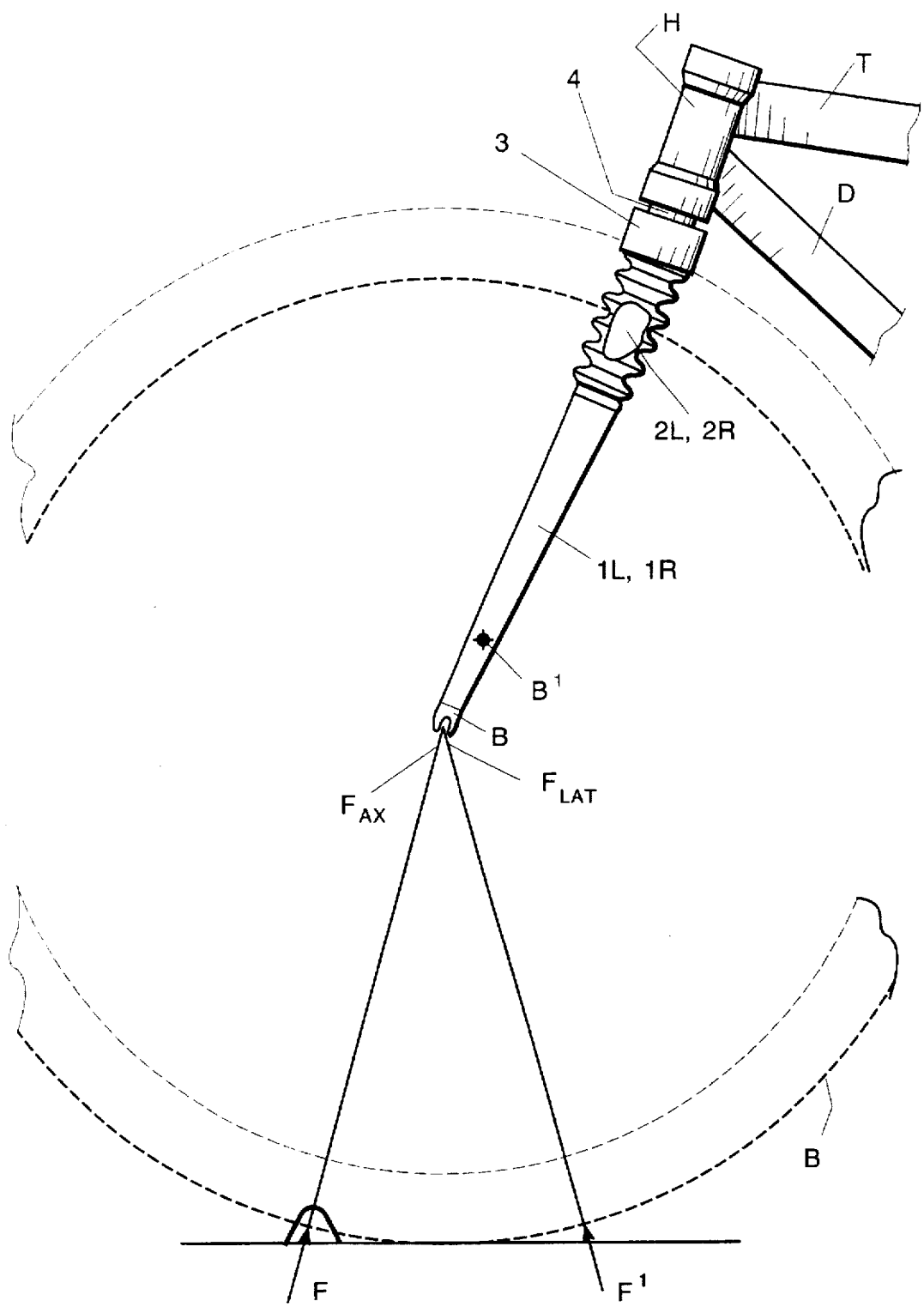
FIG. 1 is a side view of a prior art telescoping, non-pivoting, front fork suspension concept.

A typical prior art telescoping, front fork suspension system is illustrated in FIG. 1. The suspension assembly consists of two telescoping struts (1L, 1R), two stanchions (2L, 2R), a crown (3), and a steerer tube (4). The suspension is connected to the bicycle frame (Head Tube H, Top Tube T, and Down Tube D shown) by a set of head set bearings located in the head-tube (H). The steerer tube (4) makes the connection with the head set bearings. The telescoping fork geometry does not have a good geometry with the impact loads. As illustrated in FIG. 1, bump impact loads will have a starting orientation F and an ending orientation F', covering an angle theta. The orientation of the loading vector is not aligned with the telescoping struts. This introduces an axial load Fax and a lateral load Flat at the dropout (B). This loading introduces a bending moment at the stanchion tube/crown connection and the steerer tube/crown connection. This loading also gives the stanchions the tendency to cock inside the telescoping struts, increasing the amount of friction acting on the seals. As the bearings in the sliding lower tube are typically only spaced apart about 3 inches, any cocking type force is mechanically amplified or leveraged on the bearings. This suspension geometry is not very efficient at isolating bumps.

The actuation of the brakes also applies outward stress on the upper ends of the sliding lower tubes. This in turn also loads the sliding bearings, increasing the operating friction.

The weight of one of the lightest modern telescoping forks, the 1344 grams with the protector boots in a 1.125 inch steerer. This is heavier than its advertised weight.

Trailing Link Concept

Figure 2:
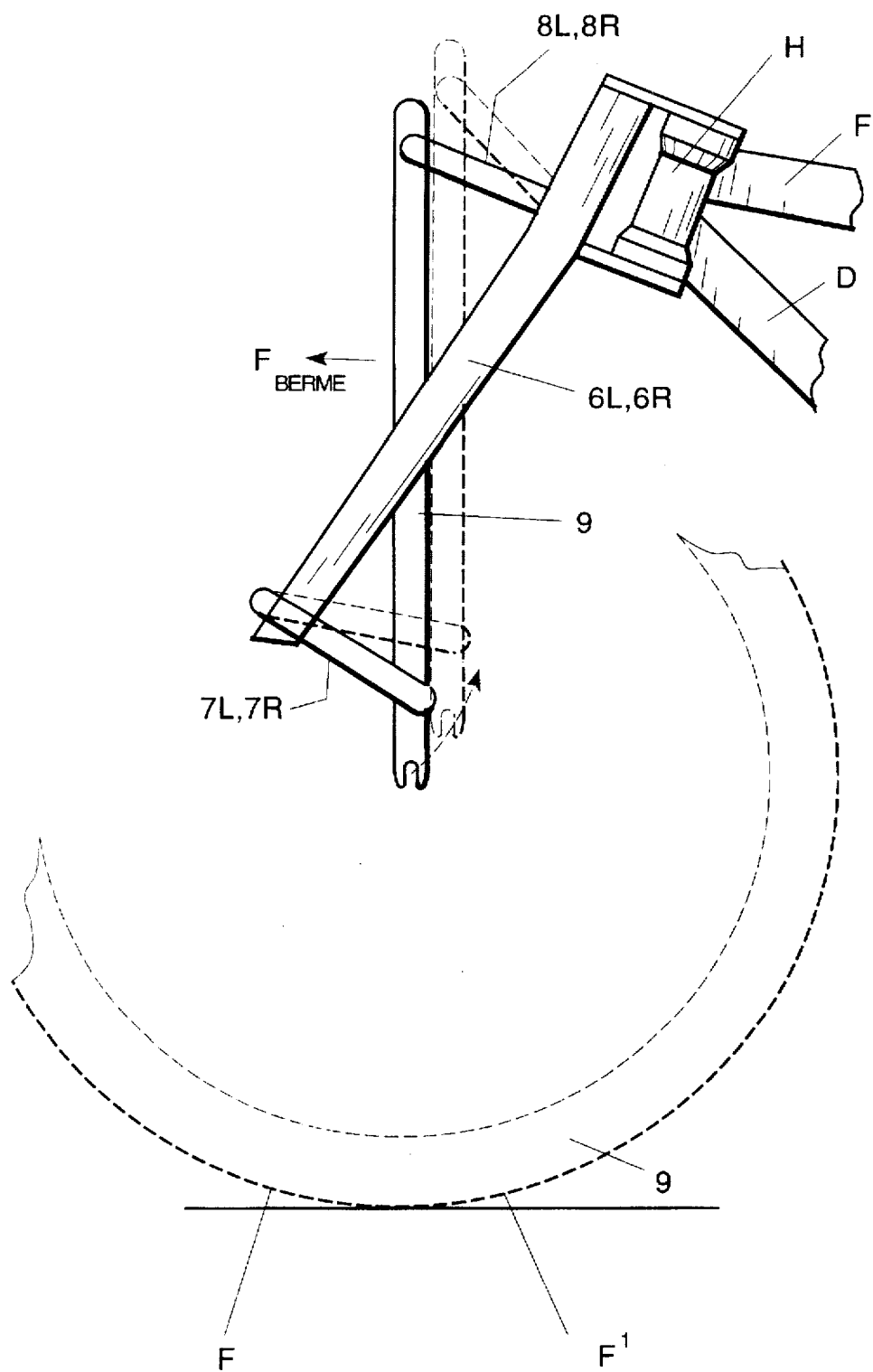
FIG. 2 is a side view of a front fork, trailing link suspension design with an improved anti-squat linkage geometry.

FIG. 2 illustrates a trailing link front fork concept that can be used to provide the desired rearward and upward (reverse curve) movement of the wheel during impact (path E–E'). The design consists of two stationary stanchion tubes (6L, 6R), two lower trailing links (7L, 7R), two upper follower links (8L, 8R) and the suspended fork link (9), connected to the front wheel assembly (9). This arrangement is a four-bar linkage configuration allowing the fork and connecting wheel to move independently of the bicycle frame during wheel impact. The linkage arrangement in this design provides a much better alignment between the wheel path and the wheel impact force vector compared to the telescoping fork concept in FIG. 1. This will result with a smoother action during wheel impact. There are several negative features of this design, however, that make it inferior to the invention disclosed herein. First, the concept requires a "cross-over" configuration where the upper part of the suspended fork link (9) is located ahead of the stanchion tubes (6L, 6R) and the lower part of the link is located behind. This arrangement forces the entire assembly to be wider than desired since both the suspended fork and the stanchion tubes must straddle the tire. This gives the assembly and odd, bowlegged appearance which is not particular good for aesthetics and marketing appeal. Also, this arrangement requires more structure, hence, more weight and flexibility. Neither are desirable characteristics. Another drawback of this design is that it requires a rotary type spring or an unusual leaf spring to provide the isolation function. Neither spring type would be easy to design or to manufacture inexpensively.

A Leading Link Concept

Figure 3:
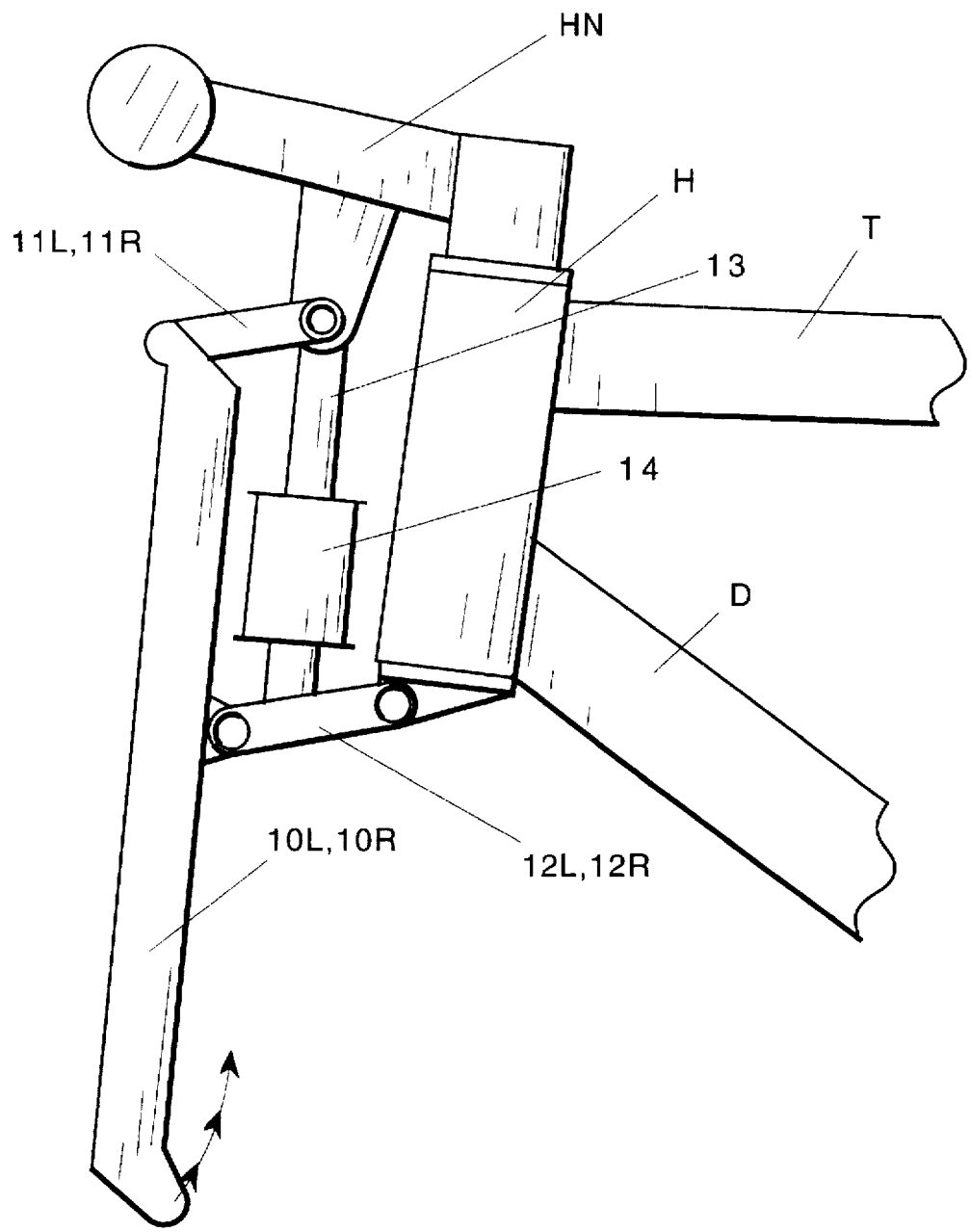
FIG. 3 is a prior art leading link suspension design showing some of the limitations that have been resolved by the disclosed design.

FIG. 3 shows a prior art leading link design with a trailing link action. This concept does not use stanchion tubes or a conventional fork crown assembly like the design shown in FIG. 2 (Items 6L and 6R). The design consists of two fork links (10L, 10R), suspended by an upper and lower pair of links (11L, 11R and 12L, 12R respectively), forming a four-bar linkage arrangement. Within this four-bar linkage is mounted a compression strut (13) connecting the stationary part of the upper link pair (A) with a point on the lower link pair (F). Within this strut is mounted an elastomeric pad (6) to provide the spring function. There are several key problem areas with this design that make it inferior to the invention herein.

First, the compression strut (13) is directly connected to the handlebar neck (HN), making it impossible to adjust the height of the handlebar.

Second, the elastomeric spring element (14) is completely exposed to the environment, including ultraviolet light. This can have a long term detrimental effect on the material properties, hence, the performance of the suspension. A covering could be designed for the spring element, however, this would add weight to the system.

Third, the linkage geometry will be different for different sizes of bicycle frames, thus, each frame size would have different suspension characteristics unless the suspension was custom designed for each one.

Fourth, the torsional rigidity for this design is dependant on the linkage connections. Although initial torsional rigidity is adequate, better than sliding type forks, the design has some shortcomings. In the prior art designs the linkages are narrow, making the entire assembly more susceptible to "play" in the joints. With use, the joints may wear and thus produce lower torsional rigidity for the assembly. This is not a desirable feature.

Fifth, the linkage arrangement of this design produces a leverage ratio of nearly 1.0 on the spring element. This means that the spring pad displacement will be approximately the same as the displacement of the wheel and softer, less durable, elastomeric materials will be required to limit the spring force. Leverage ratios considerably higher than 1.0 are desired to allow the use of more durable materials having a higher compression strength. Higher leverage ratios also allow the wheel to travel further, without "bottoming-out" the spring element, thus giving more effective stroke for the suspension.

Sixth, it is not a light weight design at 1744 grams.

Seventh, the prior art fork, because of the limitations of the nearly 1:1 leverage ratio on the elastomer, has less suspension travel than is desirable, only 30 mm.

Other linkage type forks suffer from lack of steering control due to stiffness. The moving fork portion is less than 20 mm in maximum section width or diameter. The link width of each is less than 20 mm in cross section. The bearing spacing in each of the lower pivots (near the dropouts) is less than 20 mm, and these three forks use a sliding upper bearing.

DETAILED DESCRIPTION OF THE INVENTION

Figure 4:
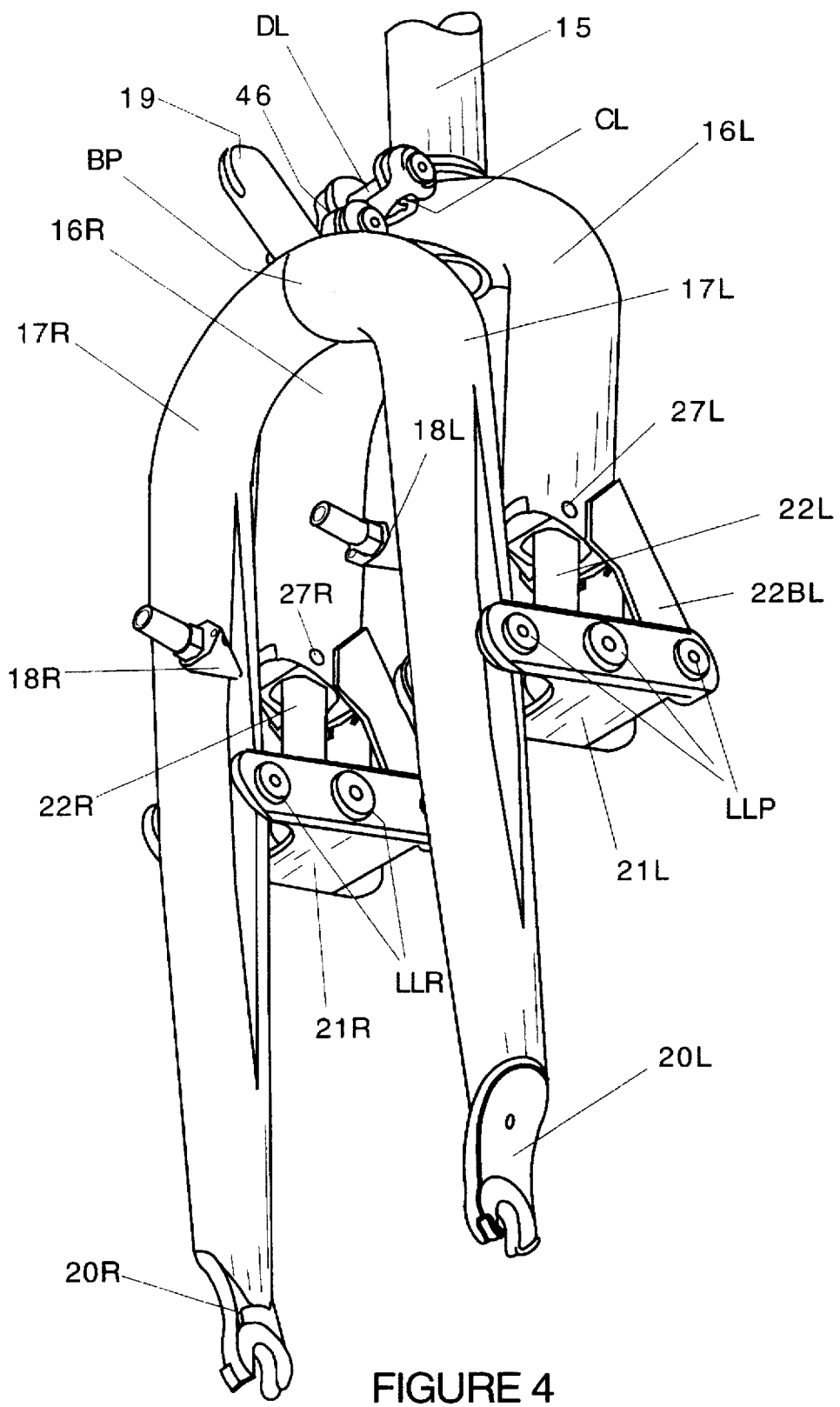
FIG. 4 shows an oblique view of a front fork bicycle suspension system incorporating the invention with its leading link, three pivot geometry.
Figure 5:
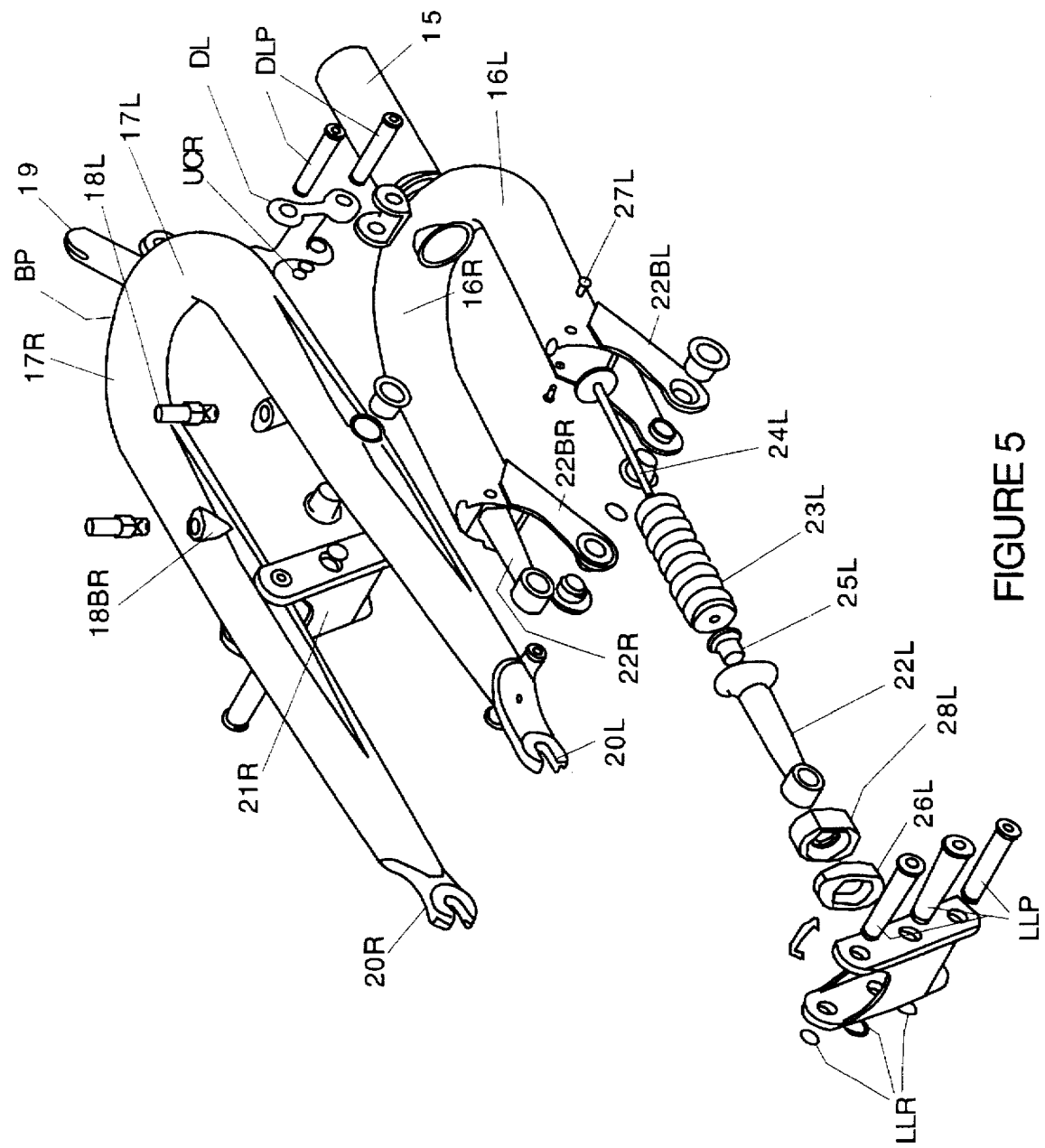
FIG. 5 is an exploded, isometric view of the suspension system of FIG. 4 showing the leading fork and trailing half-fork structures and the pivot/linkage and elastomeric spring assemblies.

FIGS. 4 and 5 show preferred embodiments of the invention. FIG. 4 is an assembly drawing showing the configuration of the assembled unit. The structure of the unit consists of a rear shortened fork assembly, forming the support base, connected by a 3-point linkage to a front (suspended) moving fork assembly. The half-fork assembly is comprised of a standard steerer tube (15) and two fork crown/blade-stubs (16L and 16R). These parts may be connected by welding, brazing bonding or other clamping means. The shortened blades (compared with a conventional rigid fork) may be attached directly to the steerer or to a fork crown assembly. The front moving fork assembly and contain the spring assemblies and protect them from the environment is comprised of two fork blades (17L and 17R) joined at the top for example by welding (the moving fork could be of a single piece design with a U bent tube construction). The preferred configuration uses a tube construction for the moving fork with a large 32 mm section and a lightweight wall to achieve high strength and stiffness with light overall weight. Welded or attached to each moving fork blade are the brake bosses (18L and 18R) and the wheel dropouts (20L and 20R). A brake cable guide support (19) is also welded at upper end of the moving fork.

Figure 6:
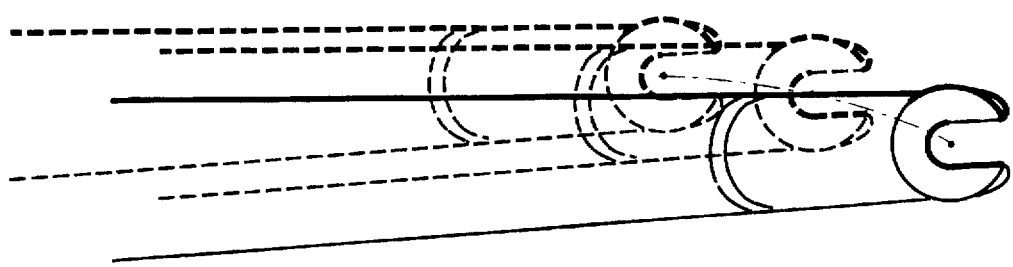
FIG. 6 is a schematic showing the preferred reverse curve, trailing link action produced by the invention during wheel impact.

The front and rear forks are connected by a 3-point linkage arrangement consisting of two lower links (21L and 21R) and a single upper link (DL). The linkage geometry is configured so that the wheel assembly (hence, the dropouts 20L and 20R) travel in a rearward and upward movement during impact, as described by path A–A'–A" in FIG. 6. This is sometimes referred to as the "reverse curve" or the "trailing linkage action". This is the preferred motion for the wheel assembly since it follows the natural tendency for the wheel when it impacts an obstacle.

A preferred embodiment of the present invention provide a suspension travel of at least 50 mm with 60 mm being desirable.

The lower links have a substantial width of 38 mm and a hollow tubular section in order to minimize deflection compared to typical link widths of less than 20 mm and the pivots utilize wide bearing spacings of 32 mm in the lower link pivots and 38 mm in the upper pivot in order to maximize rigidity in torsion and lateral modes, while minimizing bearing pivot friction. Preferably, low friction Teflon™-bronze bushing pivots are used.

The two lower links (21L and 21R, FIG. 4) are pivotally connected intermediate their clevised ends by lower link pins LLP and lower link locking rings LLR to the spring compression struts (22L and 22R) which travel in crown blade stub brackets 22BL, 22BR and in such a manner as to provide leverage on the springs by a ratio of at least 2:1. This leverage helps to reduce the effects of static friction (roughness) in the assembly during stroking. It is easier for the moving fork to overcome the small amount of static friction associated with the spring assembly as it has a mechanical advantage of at least 2:1 to do it. Details of the spring connections are shown in an exploded view of the assembly in FIG. 5. Only one of the spring assemblies is exploded for viewing.

Spring Elements

The invention may be configured with either conventional metallic springs or elastomeric springs. The preferred configuration is with micro cell foam elastomeric spring elements, as shown in FIG. 5.

Conventional Coil Springs

Conventional coiled type springs are available, for virtually all shapes and sizes. This type of spring could be easily incorporated in the invention, by sizing the spring to fit within the rear stub fork (17L and 17R). However, these springs tend to be quite heavy and are not very efficient. They are also difficult to "fine tune" for a given application to achieve optimal suspension performance. They are a lesser preferred embodiment of the invention.

Elastomeric Springs

Elastomeric springs have become popular in recent years due to the high performance materials that are now available on the market and constitute a preferred embodiment of the invention. One candidate material is a micro-cellular polyurethane elastomer. The material has the unique property of progressive stiffness which means that springs made from this material will have the progressive spring rate characteristics desired for bicycle suspensions. The materials available today have strength and stiffness characteristics within a range that is acceptable for bicycle applications. Impact stresses in excess of 20N/mm$^2$ (2800 psi) can be handled without destroying the material. Material densities in the range of 0.35 to 0.65 gram/cm$^3$ (21.8 to 40.6 lbm/ft$^3$) are available. Because of the trapped air spring mechanism, this material can be compressed to only forty percent of its extended length. This is an energy storage capacity per weight which is much higher than conventional metallic springs.

The spring elements in the invention (23L, 23R—23R not shown) are basically hollow cylindrical shapes sized to provide the desired force-displacement characteristics for the suspension assembly. The length of the part is such that when full travel of the suspension is reached the material does not completely compress or "bottom-out". As noted above, in a preferred embodiment of the invention, they are elastomeric springs made of a micro-cellular polyurethane elastomer.

The spring elements (23L and 23R) are activated by the compression strut (22L and 22R) when the lower links (21L and 21R) having clevis ends rotate upward during impact. With a leverage of at least 2:1 they apply a compression force to the compression struts 22L, 22R which in turn applies load to the spring elements. Spring alignment rods or centering probes (24L and 24R—24R not shown) are used to keep the spring element centered inside the fork blade stubs 16L, 16R. The spring alignment rods or centering probes ride inside centering bushings (25L and 25R—25R not shown) mounted to the compression struts. The bushings allow the compression struts to be hollow, for weight reduction.

A rebound stop is provided in each of the spring assemblies so that when the primary spring elements unload quickly, there is no metal-to-metal contact at the end of the expansion stroke. The rebound stops (26L and 26R—26R not shown) are fastened into position with four screws, two per side (27L and 273R), combined with a mechanical interlock with the fork blade. The rebound springs (28L and 28R—28R not shown) are for example shaped parts made from an elastomeric material.

Damping Elements

Damping is important to the performance of a suspension system. Without damping, resonant points within the system can exist. When the system operates near these resonant points, large amplitude vibrations can occur. This not only reduces the shock isolation characteristics of the suspension system but also introduces a real threat to the integrity of the suspension structure. Damping in bicycle suspension systems should be able to be tuned to the particular riding environment and even to a particular rider. Damping should be proportioned to the degree of velocity or severity of a bump and should vary with the position of the suspension (stroke dependant). The damper mechanism should operate smoothly (very low static friction). In some cases it is advantageous for the damping mechanism to have different damping curves for compression than rebound. The damping rate should be relatively insensitive to temperature. Also, the damping mechanism should be able to dissipate the energy it absorbs without a significant rise in damper fluid temperature.

The damping mechanism should be sealed or protected in such a manner so as not to be subject to rapid deterioration by dirt and the environment or leaking of its internal fluid. Optionally the damping means could have a bypass passageway controlled externally for adjusting the amount of damping to accommodate the desires of the rider.

Figure 7A:
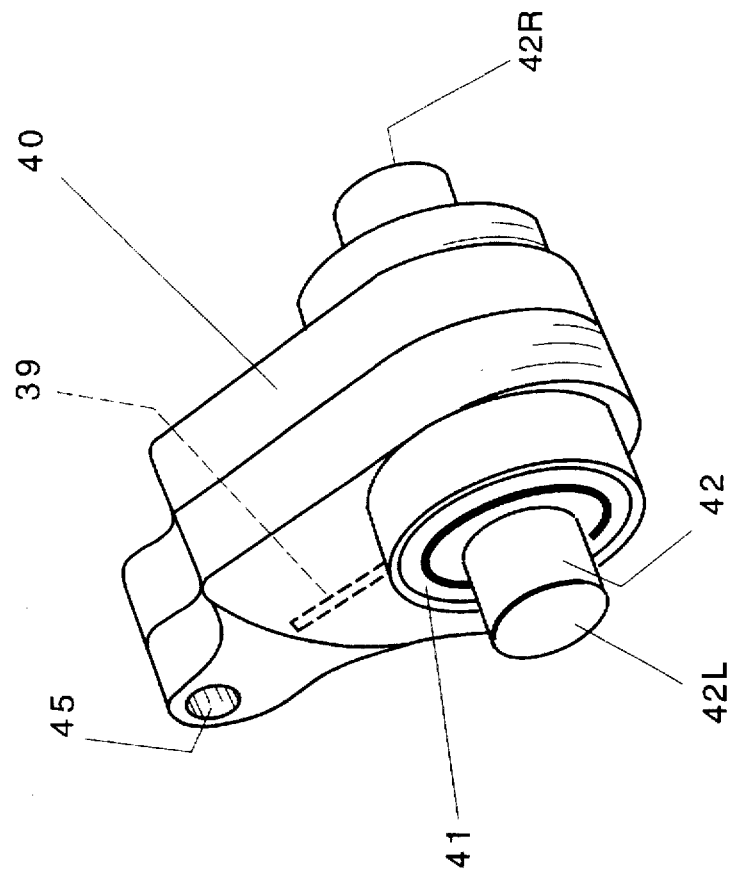
FIG. 7a is an isometric view of a low friction, fluid logic rotary damper which can be used in the upper link.
Figure 7B:
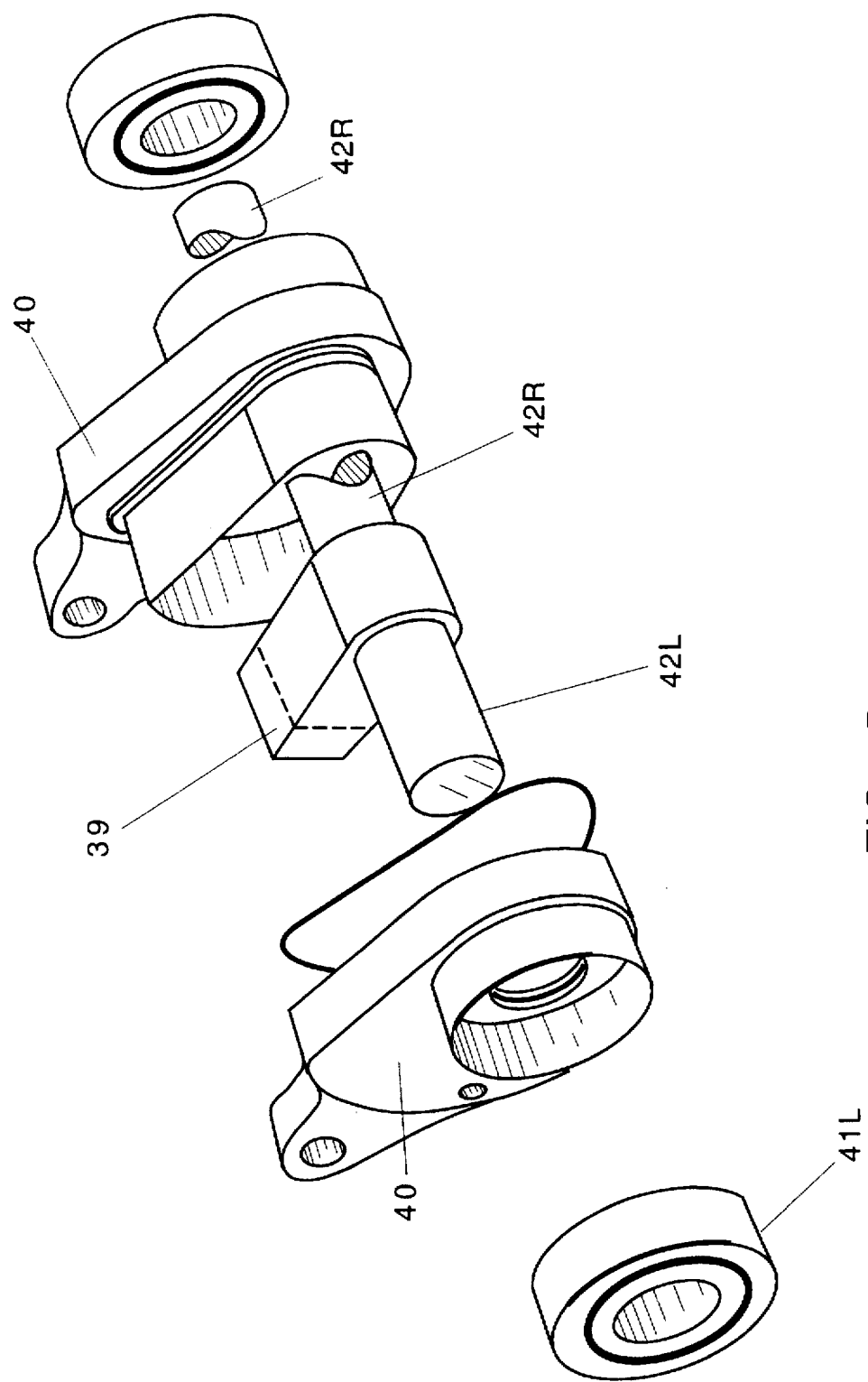
FIG. 7b is an exploded view thereof.

The invention in the preferred configuration is a rotary hydraulic fluid logic shock absorber shown in FIGS. 7a and 7b (details of which are shown in said PCT application, and incorporated herein by reference) integrated with the upper or damper link (DL). This, however, does not preclude other types of dampers (rotary, linear or otherwise), the number of damping devices in the system, or their locations within the linkage. Shafts 42L and 42R fit in the clevis CL while the bridge pin connector 45 is pivotally coupled to a second upper clevis 46 on the upper end or bridge portion BP between blades 17R and 17L. The fore and aft direction of the damper link could be reversed. In the preferred configuration the upper or damper link (DL) activates the rotor 39 inside the hydraulic fluid filled damper housing 40, creating the damping force. The combination of the elastomeric springs 23L, 23R and the rotary damper DL result with a very low static friction design having automatic fluid controlled variable damping, variable spring rate, positive geometry control and travel (or stroke) limits. The sealed ball bearings 41 for the rotary pivot shaft 42L, 42R, and the small diameter rotary seals greatly reduce friction compared to the sliding seals of a conventional linear shock absorber. Because of the small diameter of the seal surface compared to the relatively long moment arm of the shock actuator, the force required at the end of the lever arm to move the seal on the small diameter shaft is a small fraction of the seal drag at the shaft. This, combined with the very low friction pivots, results in an almost friction-less design. Note that stub shafts 42L and 42R replace one of the upper or damper link pins DLP (FIG. 5).

The invention, without using expensive materials such as high modulus Carbon fiber or Titanium, achieves a light weight of about 1300 grams, due to the large section, light weight wall structures, linkages, pivots, bearings and springs. This is much lighter than other linkage or telescoping type forks. Yet it achieves this with superb structural strength and steering precision and control. The large section moving fork provides rigid support for the brakes and brake cable housing stop with resulting excellent brake feel and function.

While preferred embodiments of the invention have been illustrated and described, it will be appreciated that various other embodiments and adaptations of the invention will be readily apparent to those skilled in the art.

What is claimed is:

1. A front fork bicycle suspension device comprising a fixed fork with steerer tube, bearings, crown and fork blades, said fork blades being hollow shortened fixed fork blades, a front moving fork assembly with integral front blades having upper and lower ends and wheel attachments at the lower end of each front blade, respectively, lower linkage means including a pair of lower links linking said front moving fork to said fixed fork blades, said lower links having forward and rear ends, the forward end of each lower link being pivotally attached to each of the moving fork blades intermediate said upper and lower ends of said front moving fork, and the rear end of the each lower link being pivotally attached near the lower end of the respective fixed fork shortened blade, respectively, and an upper link means having a forward end which is pivotally connected at the upper end of said moving fork and a rear end which is pivotally connected to said fixed fork near the lower end of said steerer tube, said lower links having lengths, positions and angles which are configured such that for a stroke starting from a full extension, the wheel attachments move upwards and substantially rearward initially, gradually moving more directly upwards as the stroke progresses to full stroke.

2. The front fork bicycle suspension device defined in claim 1 wherein said crown and fork blades include a pair of suspension springs and wherein one each of said suspension springs is positioned inside each hollow shortened fixed fork blade, respectively.

3. The front fork bicycle suspension defined in claim 2 wherein the suspension springs are made of elastomer material.

4. The front fork bicycle suspension system defined in claim 2 wherein said suspension springs are made of microcell foam elastomer.

5. The front fork bicycle suspension system defined in claim 2 wherein said suspension springs are made of polyurethane micro-cell foam elastomer.

6. The front fork bicycle suspension system defined in claim 2 wherein each said suspension spring is operated by a compression strut pivotally connected on its lower end to the region intermediate the ends of each of said lower links, respectively, and sliding in said hollow bore of said shortened fixed fork blade.

7. The front fork bicycle suspension system defined in claim 6 wherein each suspension spring in said pair of suspension springs includes a compression strut spring stack above said compression strut and a rebound stop, each said rebound stop being retained in the lower end of said compression strut, respectively.

8. The front fork bicycle suspension system defined in claim 7 wherein said one or more suspension springs are micro-cell polyurethane foam elastomer.

9. The front fork bicycle suspension system defined in claim 1 wherein said lower links have a width of at least 38 mm.

10. The front fork bicycle suspension system defined in claim 1 wherein each said integral front blade has a cross-section diameter at its largest point of at least about 32 mm.

11. The front fork bicycle suspension system defined in claim 8 wherein the suspension springs include a center hole, and a spring alignment rod passing through said center hole.

12. The front fork bicycle suspension system defined in claim 2 wherein said upper link means includes a rotary shock absorbing unit.

13. The front fork bicycle suspension system defined in claim 2 wherein said upper link means is made of high strength low friction polymer.

14. The front fork bicycle suspension system defined in claim 2 wherein the entire front fork suspension system weighs less than about 1300 grams.

15. The front fork bicycle suspension system defined in claim 2 wherein said stroke starting at full extension has a predetermined suspension travel and the suspension travel is at least about 50 mm.

16. The front fork bicycle suspension system defined in claim 2 wherein said lower links are at least about 38mm in maximum cross-section dimension.

17. The front fork bicycle system defined in claim 2, said linkage is comprised of pivots and lever arms arranged in a leading link geometry, including as part of the linkage one or more shock absorbing units and at least two springs, and wherein said at least one shock absorbing unit is a rotary shock absorber and said two springs are each elastomeric springs.

18. The front fork bicycle suspension system defined in claim 2 wherein each respective hollow shortened fixed fork blade includes a rearwardly extending projection bracket to which said rear end of said lower link, respectively, is pivotally connected.

19. The front fork bicycle suspension system defined in claim 18 wherein each of said suspension springs, respectively, is leveraged by a ratio of at least 2:1.

20. The front fork bicycle suspension system defined in claim 18 wherein said springs are comprised of a microcellular urethane foam for the spring element material.

21. The front fork bicycle suspension system defined in claim 2 in which said blades are constituted by large diameter, lightweight, structural tubing and constitute a brake bridge which forces equal stroking of each suspension springs whereby wheel wobble during impact is minimized.

22. The front fork bicycle suspension system defined in claim 1 wherein said linkage means incorporates low friction teflon-bronze bushing pivots and a low friction, rocking spring compression strut to minimize static friction in said suspension system.

23. The front fork bicycle suspension system defined in claim 1 including a micro-cell polyurethane foam elastomer suspension spring located inside of each hollow shortened fixed fork blade to protect the suspension spring from the environment.

24. The front fork bicycle suspension system defined in claim 21 wherein the said rotary shock absorber having a housing with two sides, a shaft protruding said sides of said housing, rotary bearing means supporting the shaft in said housing, a vane element in said housing, said rotary shock absorber aiding in the control of the motion of the front fork bicycle suspension system and assisting in maintaining a correct orientation of the front fork bicycle suspension system through its suspension travel and keeping the front fork bicycle suspension system from rocking, twisting, deflecting laterally.

25. The front fork bicycle front fork suspension system as defined in claim 1 arranged and adapted to maintain a correct orientation of the front fork bicycle suspension system through its suspension travel and keeping said wheel attachments from wobbling, twisting, deflecting laterally.

* * * * *